(12) United States Patent
Ash et al.

(10) Patent No.: US 10,831,559 B2
(45) Date of Patent: *Nov. 10, 2020

(54) PROCESSOR THREAD MANAGEMENT

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Trung N. Nguyen, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,183

(22) Filed: Dec. 13, 2017

(65) Prior Publication Data

US 2018/0101414 A1    Apr. 12, 2018

Related U.S. Application Data

(63) Continuation of application No. 14/709,478, filed on May 12, 2015, now Pat. No. 9,870,275.

(51) Int. Cl.
*G06F 9/46* (2006.01)
*G06F 9/50* (2006.01)
(Continued)

(52) U.S. Cl.
CPC ............ *G06F 9/5083* (2013.01); *G06F 9/485* (2013.01); *G06F 9/505* (2013.01); *G06F 9/52* (2013.01); *G06F 9/526* (2013.01)

(58) Field of Classification Search
CPC ........ G06F 9/485; G06F 9/505; G06F 9/5083; G06F 9/52; G06F 9/526
(Continued)

(56) References Cited

U.S. PATENT DOCUMENTS 5,197,130 A    3/1993   Chen et al.
5,574,897 A    11/1996  Hermsmeier et al.
(Continued)

OTHER PUBLICATIONS

Boguslaysky et al., "Optimal Strategies for Spinning and Blocking", 1993, Computer Systems Research Institute, University of Toronto, Canada, 29 pages. (Year: 1993).*
(Continued)

*Primary Examiner* — Ted T. Vo
(74) *Attorney, Agent, or Firm* — William K. Konrad; Konrad Raynes Davda & Victor LLP (57) ABSTRACT

Provided are a computer program product, system, and method for managing processor threads of a plurality of processors. In one embodiment, a parameter of performance of the computing system is measured, and the configurations of one or more processor nodes are dynamically adjusted as a function of the measured parameter of performance. In this manner, the number of processor threads being concurrently executed by the plurality of processor nodes of the computing system may be dynamically adjusted in real time as the system operates to improve the performance of the system as it operates under various operating conditions. It is appreciated that systems employing processor thread management in accordance with the present description may provide other features in addition to or instead of those described herein, depending upon the particular application.

21 Claims, 5 Drawing Sheets

(51) Int. Cl.
*G06F 9/48* (2006.01)
*G06F 9/52* (2006.01)

(58) Field of Classification Search
USPC .......................................................... 718/107
See application file for complete search history.

(56) References Cited

U.S. PATENT DOCUMENTS

| | | | |
|---|---|---|---|
| 7,234,143 B2 | 6/2007 | Venkatasubramanian | |
| 7,552,426 B2 | 6/2009 | Traut | |
| 7,594,234 B1 | 9/2009 | Dice | |
| 8,046,758 B2 | 10/2011 | Dice | |
| 8,245,236 B2 | 8/2012 | Brenner et al. | |
| 9,870,275 B2* | 1/2018 | Ash | G06F 9/505 |
| 2005/0246461 A1 | 11/2005 | Accapadi et al. | |
| 2009/0150898 A1 | 6/2009 | Sohn et al. | |

OTHER PUBLICATIONS

Merriam-Webster, "Adjust", 2011, retrieved from https://www.merriam-webster.com/dictionary/adjust , 3 pages. (Year: 2011).*

IP.com, "A Scalable Method to Detect and Indicate System's Progress to Waiters of Kernel Locks", IP.com No. IPCOM000152607D, May 8, 2007, pp. 2.

Pusukuri, et al., Lock Contention Aware Thread Migrations, ACM, Feb. 2014, pp. 8.

Wikipedia, "Compare-and-Swap", retrieved online [Mar. 25, 2015], http://en.wikipedia.org/wiki/Compre-and-Swap, pp. 7.

Wikipedia, "Linearizability", retrieved online [Mar. 24, 2015], http://en.wikipedia.org/wiki/Linearizability, pp. 8.

Wikipedia, "Lock (computer science)", retrieved online [Mar. 24, 2015], http://en.wikipedia.org/wiki/Lock_(computer_science), pp. 8.

Wikipedia, "Mutual Exclusion", retrieved online [Mar. 25, 2015], http://en.wikipedia.org/wiki/Mutual_exclusion, pp. 5.

Wikipedia, "Spinlock", retrieved online [Mar. 24, 2015], http://en.wikipedia.org/wiki/Spinlock, pp. 4.

Wikipedia, "Test-and-Set", retrieved online [Mar. 24, 2015], http://en.wikipedia.org/wiki/Test-and-Set, pp. 6.

Wikipedia, "Thread (computing)", retrieved online [Mar. 25, 2015], http://en.wikipedia.org/wiki/Thread_(computing), pp. 11.

U.S. Appl. No. 14/709,478, filed May 12, 2015 (18.569).

Office action dated Jul. 29, 2016, pp. 13, for U.S. Appl. No. 14/709,478, filed May 12, 2015 (18.569).

Response dated Oct. 31, 2016, pp. 14, to Office action dated Jul. 29, 2016, pp. 13, for U.S. Appl. No. 14/709,478, filed May 12, 2015 (18.569).

Final Office Action dated Jan. 13, 2017, pp. 13, for for U.S. Appl. No. 14/709,478, filed May 12, 2015 (18.569).

Response dated May 14, 2017, pp. 15, to Final Office Action dated Jan. 13, 2017, pp. 13, for U.S. Appl. No. 14/709,478, filed May 12, 2015 (18.569).

Notice of Allowance dated Sep. 13, 2017, pp. 7, to for U.S. Appl. No. 14/709,478, filed May 12, 2015 (18.569).

List of IBM Patents or Patent Applications Treated as Related, dated Dec. 13, 2017, pp. 2.

* cited by examiner

PROCESSOR THREAD MANAGEMENT

BACKGROUND OF THE INVENTION

1. Field of the Invention

The present description relates to a computer program product, system, and method for managing multiple processor threads of one or more processors.

2. Description of the Related Art

Programmed instructions are often executed by a processor in one or more sequences of instructions. A scheduler of an operating system or other type of scheduler typically gives access to system resources such as processor, memory and communication resources for purposes of executing the instructions. The smallest sequence of programmed instructions which can be managed independently by a scheduler is frequently referred to as a "Central Processing Unit (CPU) thread". A process may include one or more such CPU threads.

A multi-processor or multi-core system can frequently execute multiple CPU threads concurrently so that multiple instructions are executed in parallel, thereby often improving system performance. In general, the more instructions that can be executed in parallel, the larger the gain in performance.

However, CPU threads of programming code which are executing concurrently may in some applications utilize various techniques for synchronizing the execution of CPU threads. For example, if two or more CPU threads are sharing a shared resource such as a shared memory resource, for example, techniques such as spin locks are frequently employed to prevent attempts to access the shared resource by more than one CPU thread at a time.

If a CPU thread is accessing the shared resource, the spin lock indicates to other CPU threads attempting to access the shared resource that the shared resource is busy. Once the shared resource is no longer busy, the spin lock permits another CPU thread to access the shared resource. As a result, the CPU thread or threads denied access to the shared resource may be relegated to continually checking the spin lock to determine whether or not the spin lock indicates that the shared resource is still busy. Waiting and checking by other CPU threads for access to the spin lock is often referred to as "spinning" and may adversely affect system performance while the CPU threads "spin." As the number of CPU threads in multi-processor systems grow, conflicts over shared resources and resultant performance loss may offset performance gains provided by additional CPU threads.

One approach to reduce contention over shared resources is to break spin locks into multiple, lower granularity locks. However, such an approach may require rewriting the programming code in such a manner as to significantly increase the complexity of the programming code. Moreover, changes to algorithms to accommodate the multiple, low granularity locks may adversely affect system performance as well.

Another approach is to experiment with different numbers of operating CPU threads. For example, in one experiment, the system may be operated with 32 CPU threads and the resultant system performance may be measured. In another experiment, the system may be operated with 64 CPU threads and the resultant system performance may be measured. The number of operating CPU threads, either 32 or 64, which gave the better system performance may be selected. However, the selected number of operating CPU threads may not be optimal for all operating conditions. For example, 32 CPU threads may provide better performance than 64 CPU threads for one level or type of workload of the system, and 64 CPU threads may provide better performance than 32 CPU threads for the same system but with a different level or type of workload. Thus, selecting an appropriate number of operating CPU threads for a given system may be difficult.

SUMMARY

Provided are a computer program product, system, and method for managing processor threads in a multiple thread computing system. In one embodiment, a parameter of performance of a computing system is measured and configurations of at least one of a plurality of processor nodes of the system are dynamically adjusted as a function of the measured parameter of performance. For example, the configurations may be dynamically adjusted to change the number of processor threads such as CPU threads being concurrently executed by the plurality of processor nodes of the computing system, as a function of the measured parameter of performance of the computing system. Other aspect and features may be achieved, depending upon the particular application.

DETAILED DESCRIPTION

Described embodiments provide techniques for managing processor threads such as CPU threads in a computing system having multiple processor nodes. In one embodiment, a parameter of performance of the computing system is measured, and the configurations of one or more processor nodes are dynamically adjusted as a function of the measured parameter of performance, to dynamically adjust the number of processor threads being concurrently executed by the plurality of processor nodes of the computing system. Thus, the number of processor threads being concurrently executed by the plurality of processor nodes of the computing system, may be dynamically adjusted in real time as the system operates to improve the performance of the system as it operates under various operating conditions. It is appreciated that systems employing processor thread management in accordance with the present description may obtain other improvements or advantages, in addition to or instead of performance improvement, depending upon the particular application.

In one embodiment, a parameter of performance which may be measured is a function of lock spin time of a spin lock for controlling access to a shared resource of the computing system by multiple processor threads of the computing system. For example, the lock spin time measured as a percentage of total CPU time over a particular interval, may provide a measured parameter of performance. It is appreciated that the higher the measured lock spin time percentage, the greater the indication of potential adverse impact on system performance due to contention of multiple processor threads competing for access to shared resources through spin locks. It is further appreciated that the measured parameter of performance may be a function of other performance characteristics such as throughput or response time, for example.

In one embodiment, a parameter range of satisfactory performance may be defined by first and second threshold values, and a measured parameter of performance may be maintained within the parameter range by dynamically adjusting configurations of the plurality of processor nodes as a function of the measured parameter of performance. Thus, a measured parameter of performance, such as lock spin time percentage, for example, may be compared to the first threshold value, and if the measured parameter of performance exceeds the first threshold value, the number of processor threads being concurrently executed by the plurality of processor nodes of the computing system, may be reduced. For example, the number of operating processor threads being concurrently executed by the plurality of processor nodes of the computing system, may be decremented by a fixed number, for example.

It is appreciated that if a measured parameter of performance, such as lock spin time percentage, for example, exceeds a particular threshold value, the number of concurrently operating processor threads of the system may be having an adverse effect on system performance. Accordingly, the number of processor threads being concurrently executed by the plurality of processor nodes of the computing system, may be correspondingly reduced.

In another aspect, a measured parameter of performance, such as lock spin time percentage, for example, may also be compared to a second threshold value of the parameter range, and if the measured parameter of performance is less than the second threshold value, the number of processor threads being concurrently executed by the plurality of processor nodes of the computing system, may be increased. For example, the number of operating processor threads of the computing system may be incremented by a fixed number, for example. It is appreciated that in other embodiments, the number of concurrently operating processor threads of the computing system may be incremented or decremented by a variable number of processor threads, which may be a function of operating conditions, for example.

Here too, it is appreciated that if a measured parameter of performance, such as lock spin time percentage, for example, is less than a threshold value, the number of concurrently operating processor threads of the system likely is not having an adverse effect on system performance. Accordingly, the number of concurrently operating processor threads of the computing system may be correspondingly increased to increase system performance.

In this manner, the number of concurrently operating processor threads of the computing system may be dynamically adjusted in real time as the system operates to increase or decrease the number of operating processor threads as operating conditions change. As a result, it is believed that the performance of the system may be dynamically improved in real time under a variety of operating conditions. For example, the system performance as measured by one or more parameters of performance may be maintained within appropriate ranges by dynamically adjusting the number of concurrently operating processor threads as changing conditions warrant.

Figure 1:
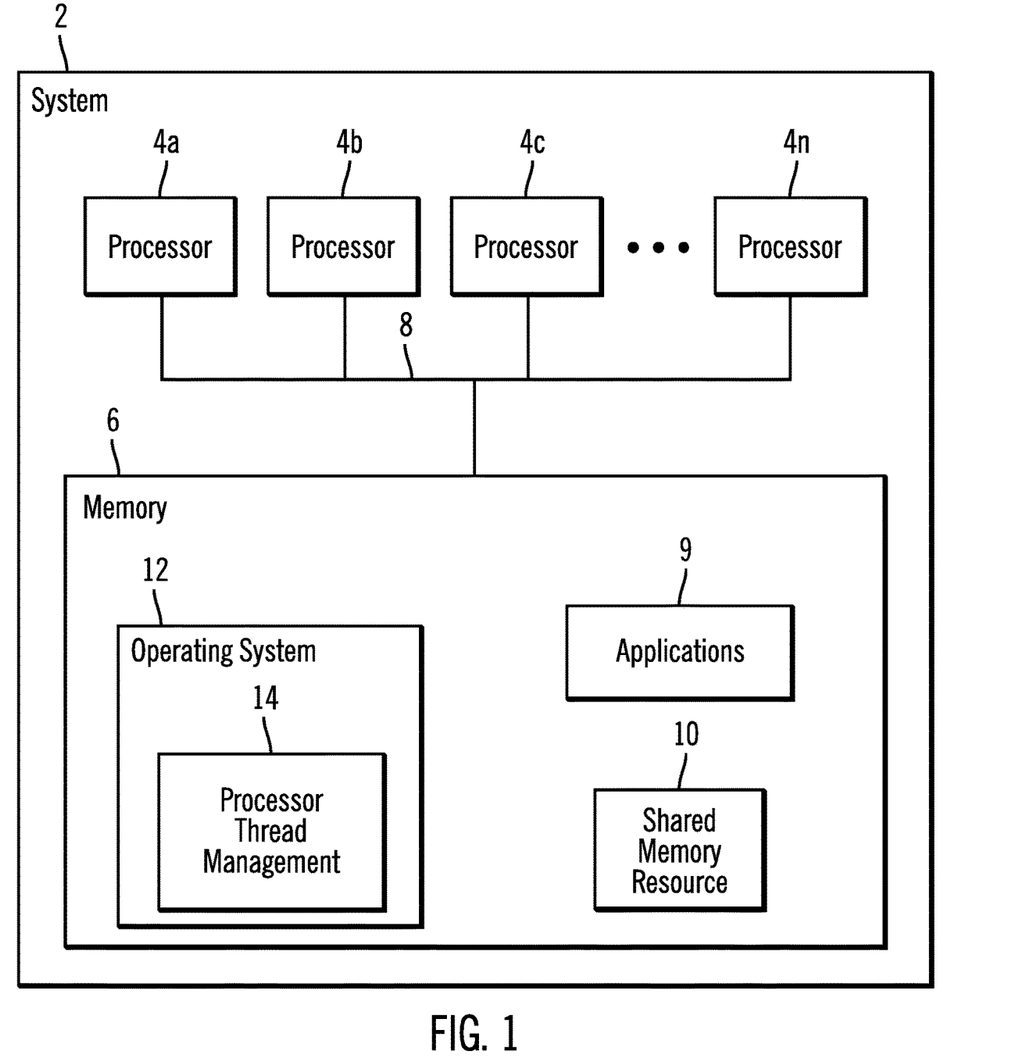
FIG. 1 illustrates an embodiment of a computing environment employing processor thread management in accordance with the present description.

FIG. 1 illustrates an embodiment of a computing system 2 employing processor thread management in accordance with the present description. The system 2 has a plurality of processor nodes represented by processors 4a ... 4n coupled to a shared memory 6 over a bus 8. The processors 4a ... 4n may execute applications 9 within the shared memory 6, utilizing shared resources, such as a shared memory resource 10, for example. A shared memory resource 10 may comprise hardware which may be virtual or physical, data structures, parameters, or program instruction code, for example. In certain embodiments, the shared memory resource 10 may include parallelized code which the processors 4a ... 4n may execute in parallel, or non-parallelized code that can only be executed by one processor 4a ... 4n at a time.

The shared memory 6 further has program code for an operating system 12 which in this embodiment, includes processor thread management logic 14 in accordance with the present description. It is appreciated that software logic of the processor thread management logic in accordance with the present description may, in other embodiments, be implemented in applications such as the applications 9 or in other software of the shared memory 6. In addition to software implementations, it is appreciated that processor thread management logic 14 in accordance with the present description may be implemented in firmware or hardware, or in various combinations of software, hardware or firmware, depending upon the particular application.

Figure 2:
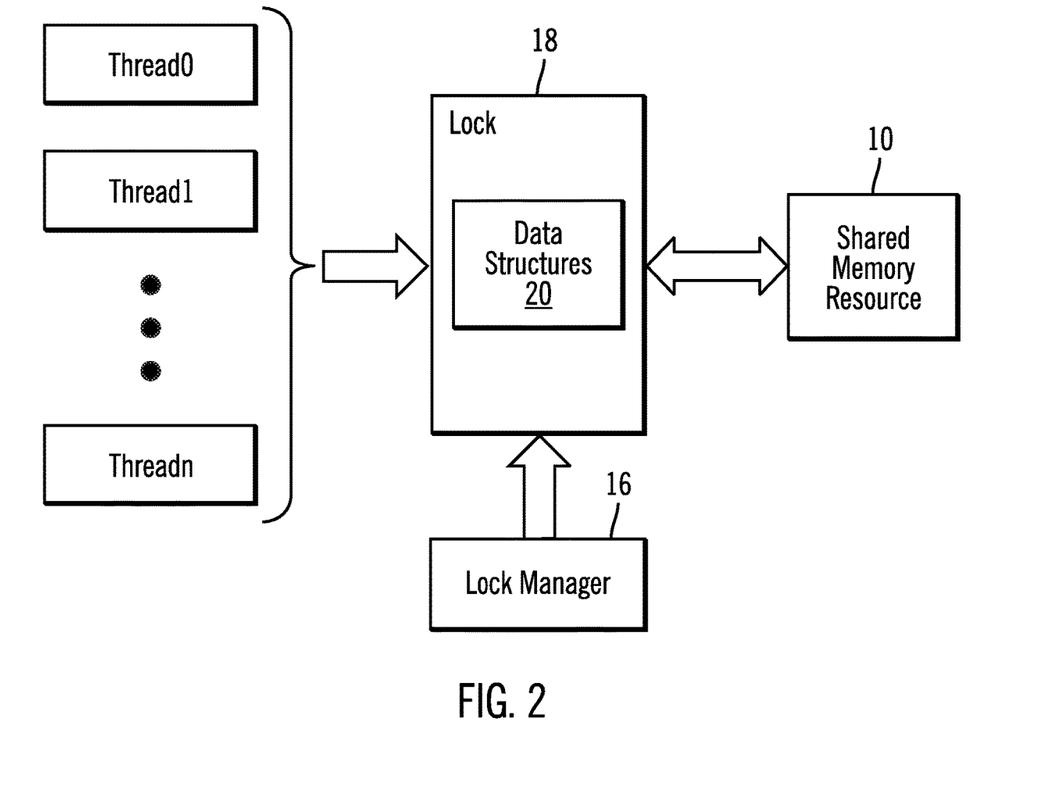
FIG. 2 illustrates a known spin lock for controlling access to a shared memory resource.

Referring to FIG. 2, a lock manager 16 includes code that is executed by the processors 4a ... 4n to manage locks, such as spin locks, as represented by a spin lock 18. A spin lock such as the spin lock 18 must be held by a processor thread to gain access to an associated shared resource as represented by a shared memory resource 10. A spin lock 18 may be implemented for example in the memory 6 (FIG. 1) and may include suitable data structures 20.

In the example of FIG. 2, multiple processor threads as represented by processor threads thread0, thread1 ... threadn, compete to take possession of the spin lock 18 to gain access to the shared memory resource 10. If a processor thread such as thread0, for example, is accessing the shared resource 10 and thus holds the spin lock 18, the spin lock 18 indicates to any of the other processor threads, thread1 ... threadn, that may be attempting to access the shared resource 10, that the shared resource 10 is busy. Once the processor thread which holds the spin lock is finished utilizing the shared resource 10, that processor thread releases the spin lock 18. Accordingly, the shared resource 10 is no longer busy, and the spin lock 18 indicates it is available to permit another processor thread to access the shared resource 10.

As previously mentioned, a processor thread or threads denied access to the shared resource 10 may be forced to spin, that is, to continually check the spin lock to determine whether or not the spin lock indicates that the shared resource is still busy. This spinning by other processor threads to wait and check for access to a spin lock such as the spin lock 18 may adversely affect system performance. As described in greater detail below, it is believed that such spinning may be reduced by processor thread management in accordance with the present description.

In one embodiment, the processors 4a . . . 4n (FIG. 1) may comprise separate central processing units (CPUs), microprocessor units or processor resources in a shared environment. In an alternative embodiment some or all of the processors 4a . . . 4n may comprises cores on one or more CPUs. In one embodiment, all the processors 4a . . . 4n are in the same system 2. In an alternative embodiment, the processors 4a . . . 4n may be in remote systems and communicate over a network.

The shared memory 6 may comprise one or more volatile or non-volatile memory or storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc. The bus 8 may comprise a bus or data transfer system known in the art, such as a Peripheral Component Interconnect (PCI) type bus.

In one embodiment, the shared memory resource 10 may comprise data structures, values and/or code for the processors 4a . . . 4n to execute. In an alternative embodiment, a shared resource may comprise a device or hardware component for the processors 4a . . . 4n to access. It is appreciated that a shared resource may be within the system 2, directly coupled to the system 2 or remote with respect to the system 2.

Figure 3:
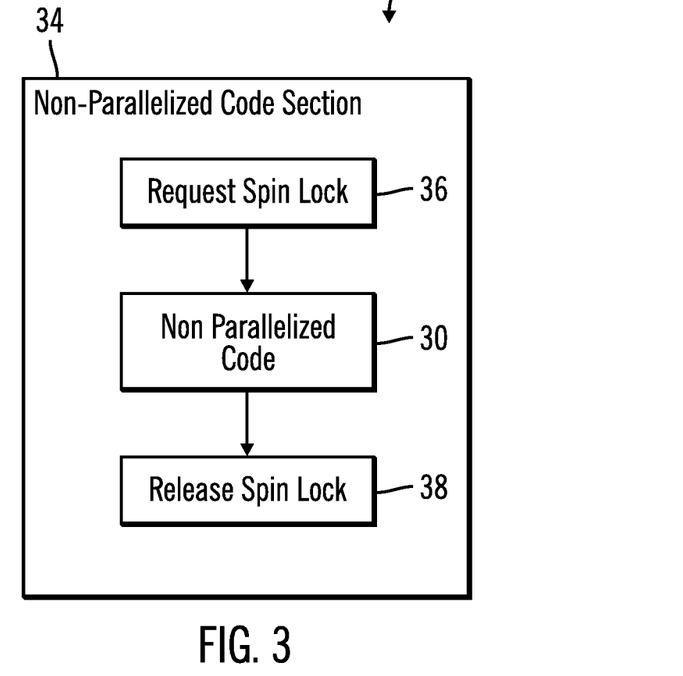
FIG. 3 illustrates a known shared memory resource which includes a non-parallelized code section.

FIG. 3 illustrates an embodiment where the shared memory resource 10 comprises non-parallelized code 30 that may only be executed by one of the processor threads thread0, thread1 . . . threadn, at a time. In one embodiment, a non-parallelized code section 34 includes code for performing lock management operations such as request spin lock 36 and release spin lock 38 as well as the non-parallelized code 30 to be executed. The requesting processor thread, thread0, thread1 . . . threadn, executes the request spin lock routine 36 until it obtains the lock 18 (FIG. 2) for the non-parallelized code 30. After executing the non-parallelized code 30, the executing processor thread, thread0, thread1 . . . threadn, holding the lock 18 executes a release spin lock routine 38 to release the lock 18 on the non-parallelized code 30 to make it available for another processor thread, thread0, thread1 . . . threadn, to execute the code 30. In one embodiment, there may be a separate lock 18 for each section of non-parallelized code 30, where different sections of non-parallelized code 30 may be separately executed. Here too, in this example, only one processor thread, thread0, thread1 . . . threadn at a time may execute a particular non-parallelized code 30 section at a time.

Figure 4:
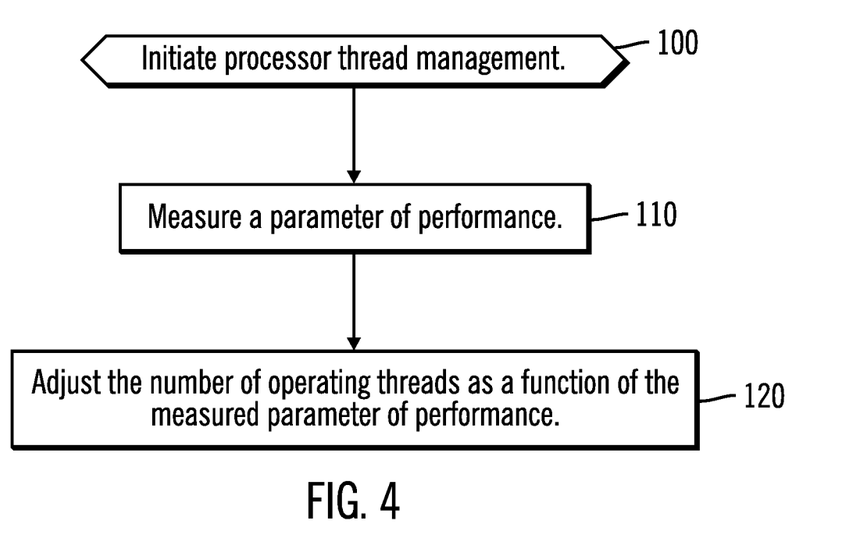
FIG. 4 illustrates an embodiment of operations of processor thread management in accordance with one aspect of the present description.

FIG. 4 illustrates an embodiment of operations performed by the processor thread management logic 14 of FIG. 1. In one operation, processor thread management in accordance with the present description is initiated (block 100). In one embodiment, the processor thread management may be initiated in a continuously operating loop, often referred to as a "forever loop" which operates concurrently with the processing operations of the computing system 2 (FIG. 1). Over the course of execution of each loop of the forever loop, the processor thread management operations of FIG. 4 would be performed. In some embodiments, a delay may be inserted into the loop to reduce utilization of system resources expended by the execution of the loop.

In another embodiment, the operations of FIG. 4 may be performed periodically in which the processor thread management is initiated upon expiration of a period of time. Each such period may be of fixed duration or may be variable in length, depending upon the particular application. Yet another embodiment may initiate the processor thread management in response to a trigger event such as a failover/failback event, a warm start event or a system configuration event, for example. Examples of system configuration events which could be utilized to trigger processor thread management operations include a system configuration in which memory is added or removed, or a processor is added or removed. Other changes to the system configuration which may be utilized to trigger processor thread management in accordance with the present description include system configurations which may affect the system capability for handling processor threads efficiently. Other embodiments may employ one or more of the above techniques in various combinations for initiating processor thread management.

In another operation, a parameter of system performance is measured (block 110). As previously mentioned, one system performance parameter which may be measured is the amount of lock spin time experienced by the concurrently operating processor threads of the system over a particular interval of time. Such a parameter may be expressed as a percentage of the total processor time of all operating processors of the system over the interval of time. It is appreciated that in other embodiments, other parameters of system performance may be observed and measured for processor thread management in accordance with the present description. Such other parameters of system performance may include for example, parameters of system performance which may be affected by the number of processor threads operating concurrently in the system. For example, in some embodiments, the output of performance counters may provide a measured parameter of system performance. Such performance counters may provide a measure of system throughput, system response time or other parameters of system performance. In addition to the output of performance counters, measures of system throughput, system response time and other parameters of system performance may be based upon feedback from hosts or peer-to-peer systems, or from customer priority/profile feedback.

Upon obtaining a system performance parameter measurement, the number of concurrently operating processor threads may be adjusted (block 120) as a function of the measured parameter of performance. In one embodiment, the processor thread management logic 14 (FIG. 1) can configure the system 2 to adjust the number of concurrently operating processor threads, either upwardly or downwardly, depending upon the value of the measured system performance parameter. For example, the processor thread management 14 of an operating system 12 may configure the processors 4a . . . 4n to change the number of permitted concurrently operating processor threads as a function of the measured system performance parameter. In other embodiments, the processor thread management 14 may configure applications 9 or other system software, hardware or firmware components, depending upon the particular application, to change the number of permitted concurrently operating processor threads as a function of the measured system performance parameter.

It is appreciated that such measurements of system performance and adjustments to the number of concurrently operating processor threads, may be utilized to alleviate bottlenecks of system performance notwithstanding that the exact nature, location or cause of the bottleneck remains unidentified. For example, a bottleneck caused by contention over a resource such as memory, locks, storage or other resources, may cause a degradation in system performance. However, by measuring system performance and adjusting the number of concurrently operating processor threads, system performance may, depending upon the particular application, be improved notwithstanding that the identity of the particular resource causing the bottleneck has not been identified.

Figure 5:
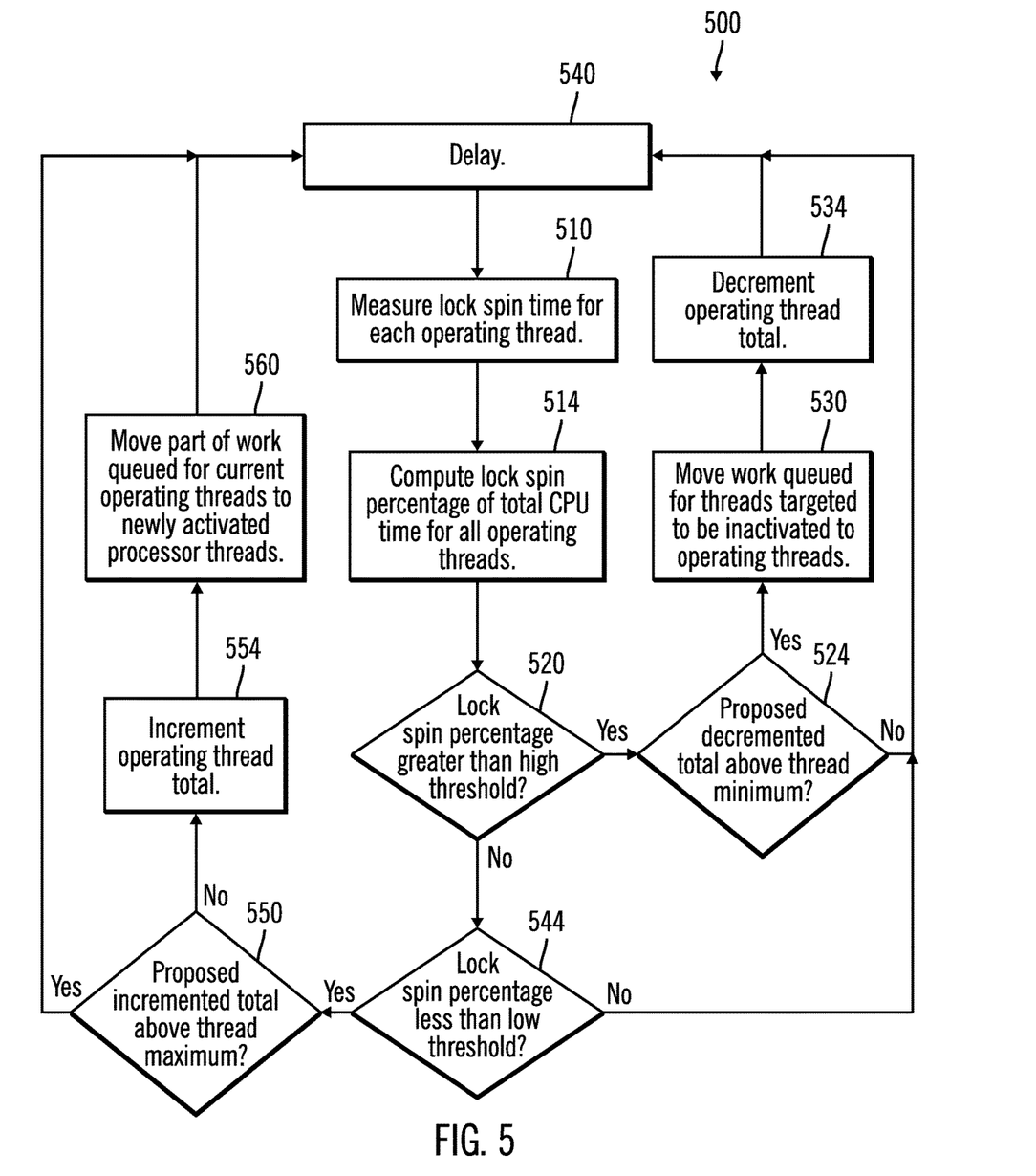
FIG. 5 illustrates another embodiment of operations of processor thread management in accordance with an aspect of the present description.

FIG. 5 depicts another example of operations of processor thread management logic in accordance with the present description. In this example, processor thread management is initiated in the form of a forever loop 500 of operations. In one such operation of the loop 500, lock spin time is measured (block 510) for each concurrently operating processor thread over a particular interval of time. In addition, a lock spin percentage is calculated (block 514) by dividing the total lock spin measured by the total CPU or processor time for all concurrently operating threads of the system over the interval. Accordingly, in this embodiment, the calculated lock spin percentage provides a measured parameter of system performance.

In this embodiment, a suitable range of system performance as indicated by the measured parameter of system performance, is defined by a high threshold value and a low threshold value. Accordingly, a determination is made (block 520) as to whether the measured lock spin percentage is greater than the high threshold value. One example of a high threshold value is a lock spin percentage of 20%. It is appreciated that other values may be selected for a high threshold value, depending upon the particular application.

If the measured lock spin percentage is determined (block 520) to be greater than the high threshold value such as 20%, for example, an adjustment to decrease the number of concurrently operating processor threads may be proposed (block 524). For example, it may be proposed to decrease the number of concurrently operating processor threads by a fixed decremental amount. One example of a fixed decremental amount is a decrease of four (4) to the total number of concurrently operating processor threads. It is appreciated that in other embodiments, a different fixed decremental amount for decreasing the number of concurrently operating processor threads may be proposed, depending upon the particular application. In other embodiments, the decremental amount proposed may be a variable amount, depending upon various factors such as user selection, operating conditions or other factors, depending upon the particular application.

In this example, a decrement of four processor threads is proposed and a determination (block 524) is made as to whether the proposed decremented total of concurrently operating processor threads is above a particular minimum of operating processor threads. In one example, the proposed adjustment to the number of processor threads may be limited so that the total of concurrently operating processor threads is limited so as to remain within a predetermined range, the lower value of which is a minimum number of concurrently operating processor threads. The upper value of the range of total concurrently operating processor threads may be defined by a predetermined maximum number of concurrently operating processor threads.

One example of a minimum number of operating threads may be a minimum of 16 operating processor threads for a computing system capable of supporting a maximum of 192 threads. It is appreciated that in other embodiments, a different minimum number of concurrently operating processor threads may be selected, depending upon the particular application. In other embodiments, the minimum number of concurrently operating processor threads may be a variable amount, depending upon various factors such as user selection, operating conditions or other factors, depending upon the particular application.

The total number of concurrently operating processor threads may be reduced by inactivating one or more processor threads changing the status of the processor thread from active or operating to inactive or nonoperating. In the illustrated embodiment, a processor thread targeted to become inactive may be made inactive by configuring one or more of the processors 4a . . . 4n (FIG. 1). In other embodiments, in addition to configuring one or more of the processor 4a . . . 4n, one or more of the operating system 12, applications 9, locks 18 or other components of the system 2 may be configured, alone or in any combination thereof, to reduce the number of concurrently operating processor threads.

If it is determined (block 524) that the proposed decremented total of concurrently operating processor threads is above the applicable minimum number of operating processor threads, the workloads of the operating processor threads targeted to become inactive, are moved (block 530) to one or more of the surviving processor threads not targeted for inactivation. The processor threads targeted for inactivation are inactivated which decrements (block 534) the total number of operating processor threads down to the proposed total. As discussed above, such a reduction in the total number of concurrently operating processor threads may reduce lock spin time and as a result, improve system performance, in some applications.

In this embodiment a delay (block 540) is provided in the loop 500 to reduce the impact on management overhead of the processor thread management of FIG. 4. This delay period may be a fixed interval or may be variable, depending upon user selection, work conditions or other factors. If it is determined (block 524) that the proposed decremented total of concurrently operating processor threads would result in the total number of operating processor threads being less than the applicable minimum of operating processor threads, the proposed reduction in the number of processor threads is not implemented. Instead, the process of FIG. 5 bypasses the thread reduction operations of blocks 530-534. Thus, no processor threads are actually changed to inactive status as a result of the system performance parameter measurement and comparison of blocks 510-520.

If the measured lock spin percentage is determined (block 520) to not be greater than the high threshold value such as 20%, for example, in other words, if the measured lock spin percentage is determined (block 520) to be less than or equal to the high threshold value such as 20%, for example, a determination is made (block 544) as to whether the measured lock spin percentage is less than the low threshold value. One example of a low threshold value is a lock spin percentage of 5%. It is appreciated that other values may be selected for a low threshold value, depending upon the particular application.

If it is determined (block 544) that the measured lock spin percentage is less than the low threshold value, an adjustment to increase the number of concurrently operating processor threads may be proposed (block 550). For example, it may be proposed to increase the number of concurrently operating processor threads by a fixed incremental amount. One example of a fixed incremental amount is an increase of four (4) to the total number of concurrently operating processor threads. It is appreciated that in other embodiments, a different fixed incremental amount for increasing the number of concurrently operating processor threads may be proposed, depending upon the particular application. In other embodiments, the incremental amount proposed may be a variable amount, depending upon various factors such as user selection, operating conditions or other factors, depending upon the particular application.

In this example, an increment of four processor threads is proposed and a determination (block 550) is made as to whether the proposed incremented total of concurrently operating processor threads is above a particular maximum of operating processor threads, an upper limit of a range imposed upon the total number of concurrently operating processor threads. One example of a maximum number of operating threads a computing system may be capable of supporting is 192 threads. It is appreciated that in other embodiments, a different maximum number of concurrently operating processor threads may be selected, depending upon the particular application. In other embodiments, the maximum number of concurrently operating processor threads may be a variable amount, depending upon various factors such as user selection, operating conditions or other factors, depending upon the particular application.

The total number of concurrently operating processor threads may be increased by activating one or more currently inactive processor threads by changing the status of the processor thread from inactive (or nonoperating) to active (or operating). In the illustrated embodiment, a processor thread targeted to be activated may be made active by configuring one or more of the processors 4a . . . 4n (FIG. 1). In other embodiments, in addition to configuring one or more of the processor 4a . . . 4n, one or more of the operating system 12, applications 9, locks 18 or other components of the system 2 may be configured, alone or in any combination thereof, to increase the number of concurrently operating processor threads.

If it is determined (block 550) that the proposed incremented total of concurrently operating processor threads is below the applicable maximum of operating processor threads, the processor threads targeted for activation are activated which increments (block 554) the total number of operating processor threads up to the proposed total. As discussed above, such an increase in the total number of concurrently operating processor threads may increase system performance to a degree which more than offsets any decrease in system performance which may result from a possible increase in lock spin time or other adverse impact on system performance. The workloads of one or more of the currently operating processor threads are moved (block 560) to one or more of the newly activated processor threads so as to move a part of the work queued for current operating threads to newly activated processor threads.

If it is determined (block 550 that the proposed incrementing of the total of concurrently operating processor threads would result in the total number of operating processor threads being more than the applicable maximum of operating processor threads, the proposed increase in the number of processor threads is not implemented. Instead, the process of FIG. 5 bypasses the thread increasing operations of blocks 554-560. Thus, no processor threads are actually changed from inactive to active status as a result of the system performance parameter measurement and comparison of blocks 510-550.

Following the programmed delay (block 540), the processor thread management operations described above are repeated in another loop of the loop 500.

Figure 6:
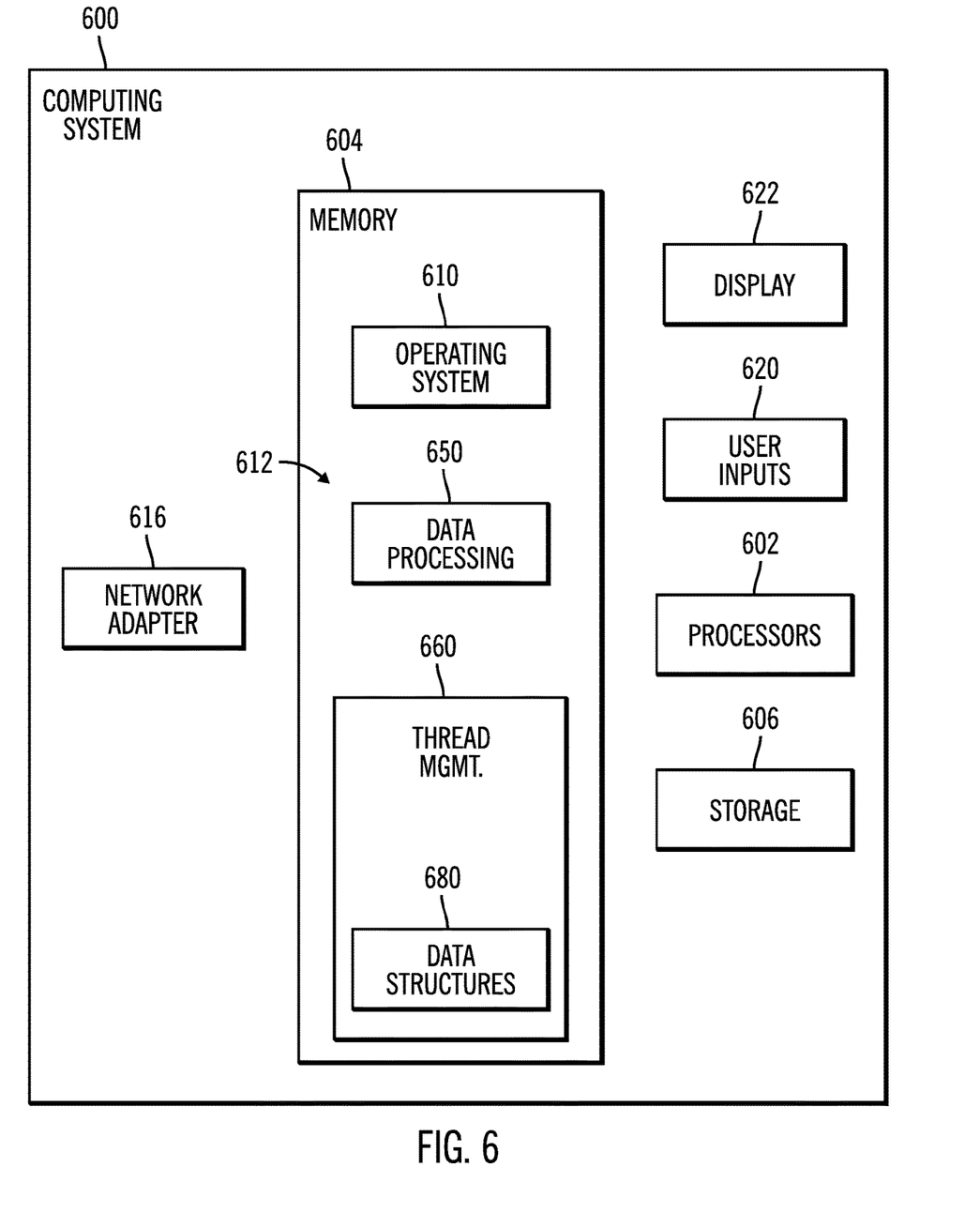
FIG. 6 illustrates another embodiment of a computing environment employing processor thread management in accordance with the present description.

FIG. 6 illustrates another example of a computing system 600 employing processor thread management in accordance with the present description. The system 600 may comprise any suitable computing device, such as a mainframe, server, personal computer, laptop, handheld computer, telephony device, network appliance, virtualization device, storage controller, etc. The computing system 600 may include one or more processors 602 (e.g., microprocessors, microprocessor cores, etc.), a memory 604 (e.g., a volatile memory device), and storage 606 (e.g., a non-volatile storage, such as magnetic disk drives, optical disk drives, a tape drive, etc.). The storage 606 may comprise an internal storage device or an attached or network accessible storage. Programs in the storage 606 are loaded into the memory 604 and executed by the processor 602 as represented by an operating system 610 and programs 612. The computing system 600 further includes a network controller or adapter 616 to enable communication with a network such as an Ethernet, a Fibre Channel Arbitrated Loop, etc. which interconnects the processor nodes of the computing system 600. The network controller or adapter 616 may also enable communication with a network path to a host or with a network path to storage.

User input devices 620 provide user input to the processor 602, and may include a keyboard, mouse, pen-stylus, microphone, touch sensitive display screen, or any other suitable activation or input mechanism. Output devices 622 are capable of rendering information transmitted from the processor 602, or other component, such as a display monitor, printer, storage, etc.

In one embodiment, the computing system 600 performs a primary data processing function such as the functions storing data in and retrieving data from the storage 606. Thus, included in the memory 604 is suitable data processing programming 650 for performing the data processing functions such data storage and retrieval, for example, in disk arrays, for example. Thus, the processors 602 may perform data processing tasks such as data backup, data deduplication, data mining, data capture, data archiving data replication, bandwidth reduced data replication, encryption of data, etc., and typically involve the transfer of large amounts of data between hosts and storage 606.

In accordance with the present description, the computing system 600 further has processor thread management programming 660 which may share some or all of the hardware of each processor in running the processor thread management programming 660, including appropriate data structures 680 in accordance with the present description. Other features and aspects may be realized, depending upon the particular application. Thus, each processor may perform other processor thread management functions within the distributed node computing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   processor thread management logic measuring a parameter of performance of a computing system having a plurality of processor nodes while the computing system is operating, at least one processor node being configured to execute at least one processor thread of program code; and processor thread management logic in response to measuring the measured parameter of performance, dynamically adjusting configurations in real time of at least one of the plurality of processor nodes as a function of the measured parameter of performance while the computing system is operating, wherein dynamically adjusting configurations in real time includes dynamically adjusting in real time the number of processor threads being concurrently executed by the plurality of processor nodes of the computing system while the computing system is operating and in response to measuring the measured parameter of performance.

2. The method of claim 1 wherein the measuring a parameter of performance includes measuring a lock spin time parameter of performance as a function of lock spin time of a spin lock for controlling access to a shared resource of the computing system by processor threads of the computing system.

3. The method of claim 1 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a first threshold value, and in response to the measured parameter of performance exceeding the first threshold value, reducing the number of processor threads being concurrently executed by the plurality of processor nodes of the computing system.

4. The method of claim 3 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a second threshold value, and in response to the measured parameter of performance being less than the second threshold value, increasing the number of processor threads being concurrently executed by the plurality of processor nodes of the computing system, wherein the first and second threshold values define a range of the parameter of performance and the measured parameter of performance is maintained within the parameter range by dynamically adjusting configurations of the plurality of processor nodes as a function of the measured parameter of performance.

5. The method of claim 1 wherein the measuring a parameter of performance includes measuring a lock spin time parameter of performance as a function of lock spin time of a spin lock for controlling access to a shared resource of the computing system by processor threads of the computing system, wherein the dynamically adjusting configurations of the plurality of processor nodes as a function of the measured parameter of performance, including adjusting the number of processor threads being concurrently executed by the plurality of processor nodes of the computing system, further includes comparing the measured lock spin time parameter of performance to a first threshold value, and in response to the measured lock spin time parameter of performance exceeding the first threshold value, reducing the number of processor threads being concurrently executed by the plurality of processor nodes of the computing system, and wherein the dynamically adjusting configurations of the plurality of processor nodes as a function of the measured parameter of performance, wherein dynamically adjusting configurations including adjusting the number of processor threads being concurrently executed by the plurality of processor nodes of the computing system, further includes comparing the measured lock spin time parameter of performance to a second threshold value, and in response to the measured lock spin time parameter of performance being less than the second threshold value, increasing the number of processor threads being concurrently executed by the plurality of processor nodes of the computing system.

6. The method of claim 1 wherein the dynamically adjusting configurations of at least one of the plurality of processor nodes as a function of the measured parameter of performance, including adjusting the number of processor threads being concurrently executed by the plurality of processor nodes of the computing system, further includes adjusting the number of processor threads being concurrently executed by the plurality of processor nodes of the computing system so that measured parameter of performance remains within a predetermined range defined by first and second threshold values.

7. The method of claim 6 wherein the adjusting the number of processor threads being concurrently executed by the plurality of processor nodes of the computing system is limited so that the total number of processor threads being concurrently executed by the plurality of processor nodes of the computing system remains within a predetermined range defined by a maximum and minimum number of processor threads.

8. A system, comprising:
a computing system having a plurality of processor nodes and memory including storage and computer programs having program code, wherein at least one processor node is configured to execute processor thread management logic and at least one processor thread of program code; and
at least one computer readable storage medium having computer readable program instructions embodied therewith, the program instructions executable by the processor node to cause the computing system to perform operations, the operations comprising:
processor thread management logic measuring a parameter of performance of the computing system while the computing system is operating; and
processor thread management logic in response to measuring the measured parameter of performance, dynamically adjusting configurations in real time of at least one of the plurality of processor nodes as a function of the measured parameter of performance while the computing system is operating, wherein dynamically adjusting configurations in real time includes adjusting in real time the number of processor threads being concurrently executed by the plurality of processor nodes of the computing system while the computing system is operating and in response to measuring the measured parameter of performance.

9. The system of claim 8 further comprising a shared resource and a spin lock configured to control access to the shared resource of the computing system by processor threads of the computing system, wherein the measuring a parameter of performance includes measuring a lock spin time parameter of performance as a function of lock spin time of the spin lock.

10. The system of claim 8 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a first threshold value, and in response to the measured parameter of performance exceeding the first threshold value, reducing the number of processor threads being concurrently executed by the plurality of processor nodes of the computing system.

11. The system of claim 10 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a second threshold value, and in response to the measured parameter of performance being less than the second threshold value, increasing the number of processor threads being concurrently executed by the plurality of processor nodes of the computing system, wherein the first and second threshold values define a range of the parameter of performance and the measured parameter of performance is maintained within the parameter range by dynamically adjusting configurations of the plurality of processor nodes as a function of the measured parameter of performance.

12. The system of claim 8 wherein the measuring a parameter of performance includes measuring a lock spin time parameter of performance as a function of lock spin time of a spin lock for controlling access to a shared resource of the computing system by processor threads of the computing system, wherein the dynamically adjusting configurations of the plurality of processor nodes as a function of the measured parameter of performance, including adjusting the number of processor threads being concurrently executed by the plurality of processor nodes of the computing system, further includes comparing the measured lock spin time parameter of performance to a first threshold value, and in response to the measured lock spin time parameter of performance exceeding the first threshold value, reducing the number of processor threads being concurrently executed by the plurality of processor nodes of the computing system, and wherein the dynamically adjusting configurations of the plurality of processor nodes as a function of the measured parameter of performance, including adjusting the number of processor threads being concurrently executed by the plurality of processor nodes of the computing system, further includes comparing the measured lock spin time parameter of performance to a second threshold value, and in response to the measured lock spin time parameter of performance being less than the second threshold value, increasing the number of processor threads being concurrently executed by the plurality of processor nodes of the computing system.

13. The system of claim 8 wherein the dynamically adjusting configurations of at least one of the plurality of processor nodes as a function of the measured parameter of performance, including adjusting the number of processor threads being concurrently executed by the plurality of processor nodes of the computing system, further includes adjusting the number of processor threads being concurrently executed by the plurality of processor nodes of the computing system so that measured parameter of performance remains within a predetermined range defined by first and second threshold values.

14. The system of claim 13 wherein the adjusting the number of processor threads being concurrently executed by the plurality of processor nodes of the computing system is limited so that the total number of processor threads being concurrently executed by the plurality of processor nodes of the computing system remains within a predetermined range defined by a maximum and minimum number of processor threads.

15. A computer program product for a computing system having a plurality of processor nodes and memory including storage and computer programs having program code, wherein at least one processor node is configured to execute processor thread management logic and at least one processor thread of program code, the product comprising at least one computer readable storage medium having computer readable program instructions embodied therewith, the program instructions executable by the processor node to cause the computing system to perform operations, the operations comprising:
  processor thread management logic measuring a parameter of performance of the computing system while the computing system is operating; and
  processor thread management logic in response to measuring the measured parameter of performance, dynamically adjusting configurations in real time of at least one of the plurality of processor nodes as a function of the measured parameter of performance while the computing system is operating, wherein dynamically adjusting configurations in real time includes adjusting in real time the number of processor threads being concurrently executed by the plurality of processor nodes of the computing system while the computing system is operating and in response to measuring the measured parameter of performance.

16. The computer program product of claim 15 wherein the computing system further has a shared resource and a spin lock configured to control access to the shared resource of the computing system by processor threads of the computing system, wherein the measuring a parameter of performance includes measuring a lock spin time parameter of performance as a function of lock spin time of the spin lock.

17. The computer program product of claim 15 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a first threshold value, and in response to the measured parameter of performance exceeding the first threshold value, reducing the number of processor threads being concurrently executed by the plurality of processor nodes of the computing system.

18. The computer program product of claim 17 wherein the dynamically adjusting configurations of the plurality of processor nodes as a function of the measured parameter of performance, including adjusting the number of processor threads being concurrently executed by the plurality of processor nodes of the computing system, further includes comparing the measured parameter of performance to a second threshold value, and in response to the measured parameter of performance being less than the second threshold value, increasing the number of processor threads being concurrently executed by the plurality of processor nodes of the computing system, wherein the first and second threshold values define a range of the parameter of performance and the measured parameter of performance is maintained within the parameter range by dynamically adjusting configurations of the plurality of processor nodes as a function of the measured parameter of performance.

19. The computer program product of claim 15 wherein the measuring a parameter of performance includes measuring a lock spin time parameter of performance as a function of lock spin time of a spin lock for controlling access to a shared resource of the computing system by processor threads of the computing system, wherein the dynamically adjusting configurations of the plurality of processor nodes as a function of the measured parameter of performance, including adjusting the number of processor threads being concurrently executed by the plurality of processor nodes of the computing system, further includes comparing the measured lock spin time parameter of performance to a first threshold value, and in response to the measured lock spin time parameter of performance exceeding the first threshold value, reducing the number of processor threads being concurrently executed by the plurality of processor nodes of the computing system, and wherein the dynamically adjusting configurations of the plurality of processor nodes as a function of the measured parameter of performance, including adjusting the number of processor threads being concurrently executed by the plurality of processor nodes of the computing system, further includes comparing the measured lock spin time parameter of performance to a second threshold value, and in response to the measured lock spin time parameter of performance being less than the second threshold value, increasing the number of processor threads being concurrently executed by the plurality of processor nodes of the computing system.

20. The computer program product of claim 15 wherein the dynamically adjusting configurations of at least one of the plurality of processor nodes as a function of the measured parameter of performance, including adjusting the number of processor threads being concurrently executed by the plurality of processor nodes of the computing system, further includes adjusting the number of processor threads being concurrently executed by the plurality of processor nodes of the computing system so that measured parameter of performance remains within a predetermined range defined by first and second threshold values.

21. The computer program product of claim 20 wherein the adjusting the number of processor threads being concurrently executed by the plurality of processor nodes of the computing system is limited so that the total number of processor threads being concurrently executed by the plurality of processor nodes of the computing system remains within a predetermined range defined by a maximum and minimum number of processor threads.

* * * * *